(12) United States Patent
Xia et al.

(10) Patent No.: US 8,180,216 B2
(45) Date of Patent: May 15, 2012

(54) LATENCY MEASUREMENT IN OPTICAL NETWORKS

(75) Inventors: Tiejun J. Xia, Richardson, TX (US); Glenn A. Wellbrock, Wylie, TX (US); Michael D. Pollock, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 694 days.

(21) Appl. No.: 11/961,702

(22) Filed: Dec. 20, 2007

(65) Prior Publication Data

US 2009/0162052 A1    Jun. 25, 2009

(51) Int. Cl.
*H04B 10/00* (2006.01)

(52) U.S. Cl. ............................................ 398/25; 398/16

(58) Field of Classification Search .................. 398/9–38
See application file for complete search history.

(56) References Cited

U.S. PATENT DOCUMENTS

| | | | | |
|---|---|---|---|---|
| 5,069,544 A * | 12/1991 | Buerli | ........................... | 356/73.1 |
| 5,319,482 A * | 6/1994 | Tsuchiya et al. | .................. | 398/31 |
| 5,546,180 A * | 8/1996 | Garel-Jones et al. | ......... | 356/73.1 |
| 5,552,881 A * | 9/1996 | Jezwinski et al. | ............ | 356/73.1 |
| H001626 H * | 1/1997 | Kersey et al. | ................... | 370/479 |
| 5,621,517 A * | 4/1997 | Jezwinski et al. | ............ | 356/73.1 |
| 5,686,986 A * | 11/1997 | Li et al. | ........................ | 356/73.1 |
| 5,903,375 A * | 5/1999 | Horiuchi et al. | ................ | 398/37 |
| 6,011,623 A * | 1/2000 | MacDonald et al. | ......... | 356/519 |
| 6,366,347 B1 * | 4/2002 | Boscher et al. | ............... | 356/73.1 |
| 6,583,867 B1 * | 6/2003 | Jennings et al. | .............. | 356/73.1 |
| 6,583,910 B1 * | 6/2003 | Satoh | ............................ | 398/182 |
| 6,594,004 B1 * | 7/2003 | Makita | ......................... | 356/73.1 |
| 6,687,464 B1 * | 2/2004 | Roberts et al. | ................ | 398/158 |
| 6,735,396 B2 | 5/2004 | Poustie | ......................... | 398/155 |
| 6,864,968 B2 * | 3/2005 | Mori et al. | .................... | 356/73.1 |
| 6,914,681 B2 * | 7/2005 | Szafraniec et al. | ........... | 356/477 |
| 7,009,693 B2 * | 3/2006 | Takashina et al. | ........... | 356/73.1 |
| 7,057,714 B2 * | 6/2006 | Fredin et al. | .................. | 356/73.1 |
| 7,109,471 B2 * | 9/2006 | Taverner | .................... | 250/227.14 |
| 7,154,082 B2 * | 12/2006 | Maas | .................... | 250/227.18 |
| 7,167,237 B2 * | 1/2007 | Shimizu et al. | .............. | 356/73.1 |
| 7,268,863 B2 * | 9/2007 | Payton | ......................... | 356/73.1 |
| 7,271,884 B2 * | 9/2007 | Payton | ......................... | 356/73.1 |
| 7,274,441 B2 * | 9/2007 | Payton | ......................... | 356/73.1 |
| 7,286,767 B2 | 10/2007 | Franck et al. | ................. | 398/135 |
| 7,304,725 B2 * | 12/2007 | Hartog et al. | ................. | 356/73.1 |
| 7,310,135 B2 * | 12/2007 | Wisseman | ..................... | 356/73.1 |
| 7,369,764 B1 * | 5/2008 | Sukegawa et al. | ............. | 398/33 |
| 7,406,234 B2 * | 7/2008 | Palmieri | ....................... | 385/123 |
| 7,620,327 B2 * | 11/2009 | Snawerdt | ...................... | 398/164 |
| 7,739,561 B2 * | 6/2010 | Matteson et al. | ............. | 714/715 |
| 7,764,363 B2 * | 7/2010 | Hayward et al. | ............. | 356/73.1 |

(Continued)

OTHER PUBLICATIONS

International Search Report and Written Opinion dated Jan. 26, 2009 issued in corresponding PCT application No. PCT/US2008/84170, 9 pages.

*Primary Examiner* — Agustin Bello

(57) ABSTRACT

A device for measuring optical latency in a test path includes an optical source to generate an optical signal. An optical modulator modulates the optical signal based on a modulation signal. An output port outputs the modulated optical signal to the test path. An input port receives a return optical signal following propagation through the test path. Latency calculating logic calculates the optical latency for the test path based on the modulation signal and the return optical signal.

18 Claims, 9 Drawing Sheets

U.S. PATENT DOCUMENTS

| | | | |
|---|---|---|---|
| 7,808,623 B2* | 10/2010 | Piciaccia et al. | 356/73.1 |
| 7,873,273 B2* | 1/2011 | Koyamada | 398/28 |
| 2002/0015200 A1* | 2/2002 | Jennings et al. | 359/124 |
| 2002/0101577 A1* | 8/2002 | Thwing et al. | 356/73.1 |
| 2003/0037333 A1 | 2/2003 | Ghashghai et al. | |
| 2004/0223759 A1 | 11/2004 | Fee | 398/25 |
| 2006/0245758 A1 | 11/2006 | Elahmadi et al. | 398/135 |
| 2007/0140705 A1 | 6/2007 | Shpantzer et al. | 398/189 |
| 2008/0175590 A1* | 7/2008 | Perkins et al. | 398/58 |

\* cited by examiner

LATENCY MEASUREMENT IN OPTICAL NETWORKS

BACKGROUND

Optical communication networks include various optical switches or nodes coupled through a network of optical fiber links. One common method used for optical communications is a synchronous optical network (SONET). SONET networks are often comprised of optical rings with interconnecting nodes attaching to the rings. In common SONET networks, a bi-directional line-switch ring (BLSR) is used for interconnecting the rings and nodes of the optical network.

Carrying capacity in a SONET network may be increased without incurring additional installation costs by multiplexing multiple signals onto a single fiber using various methods, such as time division multiplexing (TDM), where two or more different signals are carried over the same fiber, each sharing a portion of time. Another multiplexing method is wavelength division multiplexing (WDM), in which two or more different wavelengths of light are simultaneously carried over a common fiber.

Wavelength division multiplexing can separate a fiber's available bandwidth into multiple channels. Dividing bandwidth into multiple discreet channels, such as 8, 16, 40, or even as many as 160 channels, through a technique referred to as dense channel wavelength division multiplexing (DWDM), is a relatively lower cost method of substantially increasing telecommunication capacity using existing fiber optic transmission lines. In a WDM network, optical signals of differing wavelengths are combined onto a common fiber-optic line or other optical waveguide and later are separated again into the individual signals or channels at the opposite end or other point along the fiber-optic cable.

With the advent and implementation of WDM, the reach of optical signals has increased significantly, with it now being possible to transmit an optical signal from coast to coast without requiring electrical signal regeneration. "Latency" refers to the time delay between an optical signal propagating through the network and a reference signal. Accurate latency measurements are beneficial to operators and subscribers of optical network services. Known latency measuring systems are based on a sum of known latencies attributable to each segment or element in a transmission line. Unfortunately, latency values for many optical components are not known or easily identified. Additionally, determining latency across a number of network links by summing known latency values for each component in each link typically does not result in a suitably accurate latency calculation.

DETAILED DESCRIPTION OF PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with aspects described herein provide a multi segment latency measurement system and method for enabling the determination and calculation of latency values associated with an optical network or a portion of an optical network.

Figure 1:
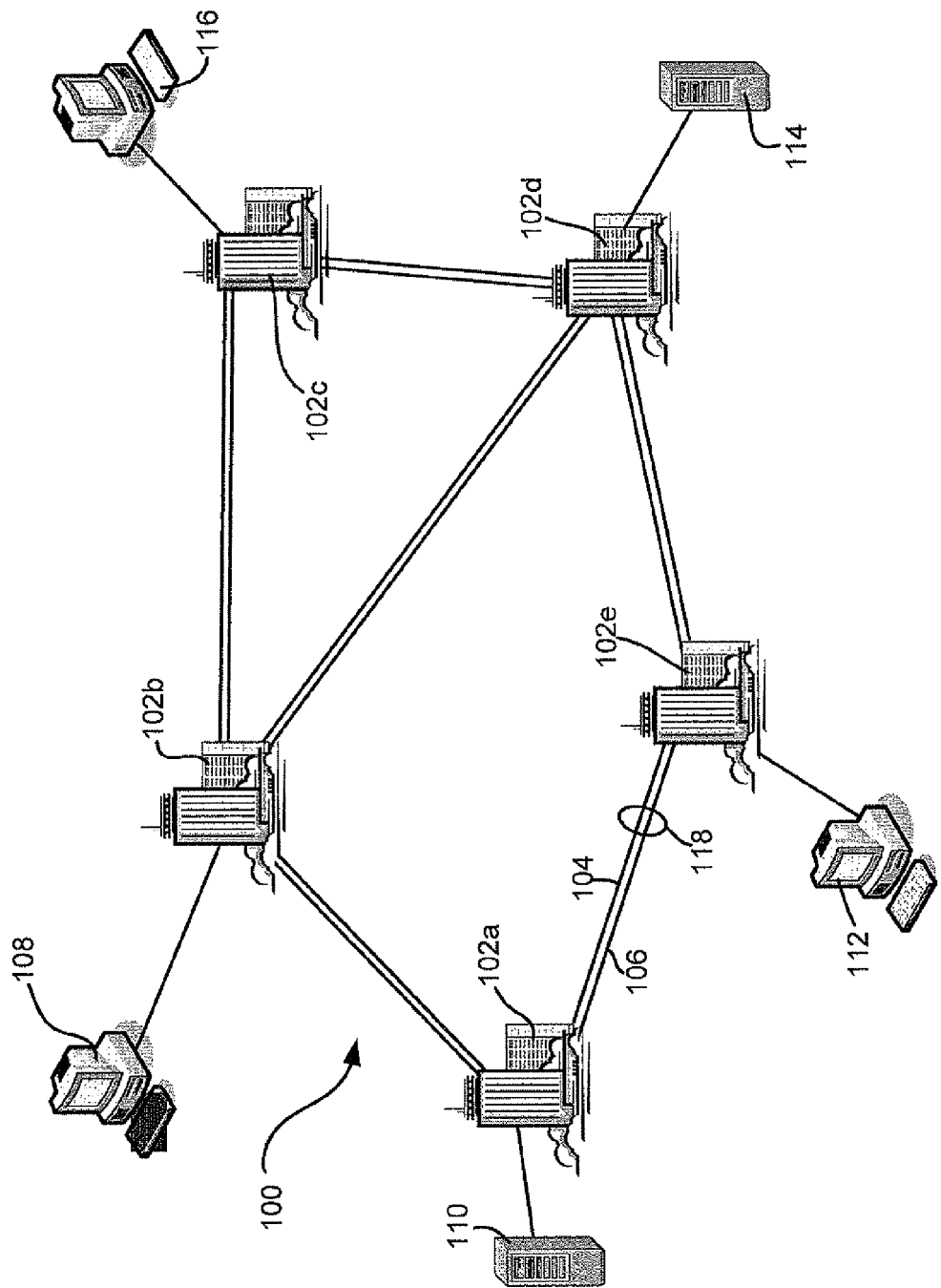
FIG. 1 is a block diagram illustrating an exemplary communications system in which systems and methods consistent with implementations described herein may be implemented.

FIG. 1 is a block diagram illustrating an exemplary communications system 100 in which systems and methods described herein may be implemented. Communications system 100 may include multiple sites 102a, 102b, 102c, 102d, and 102e connected together by links 104 and 106. Links 104 and 106 may be implemented using electrical cables, satellites, radio or microwave signals, or optical connections and can stretch for tens or hundreds of miles between sites. Through these links, the communications system 100 may carry data signals among the sites 102a-102e to effectively interconnect data equipment 108, 110, 112, 114, and 116 (e.g., computers, remote terminals, servers, etc.). In the case of fiber optic links, each link (e.g., links 104 and 106) may be configured to provide a number of high speed (e.g., 10 gigabits per second (Gbps)) connections using known wavelength division multiplexing (WDM) techniques.

In some implementations, links 104 and 106 may be bidirectional links, with each link providing one or more channels in opposite directions simultaneously. Alternatively, links 104 and 106 may be unidirectional links, each providing channels in opposite directions to each other. One or more links 104 and 106 that connect two sites may be collectively referred to as a "span 118." Each span 118 may include multiple fiber segments coupled together by elements such as optical amplifiers, add/drop multiplexers for adding a channel to a link, etc. Further, span 118 may include multiple parallel links to increase working and spare capacity.

Figure 2:
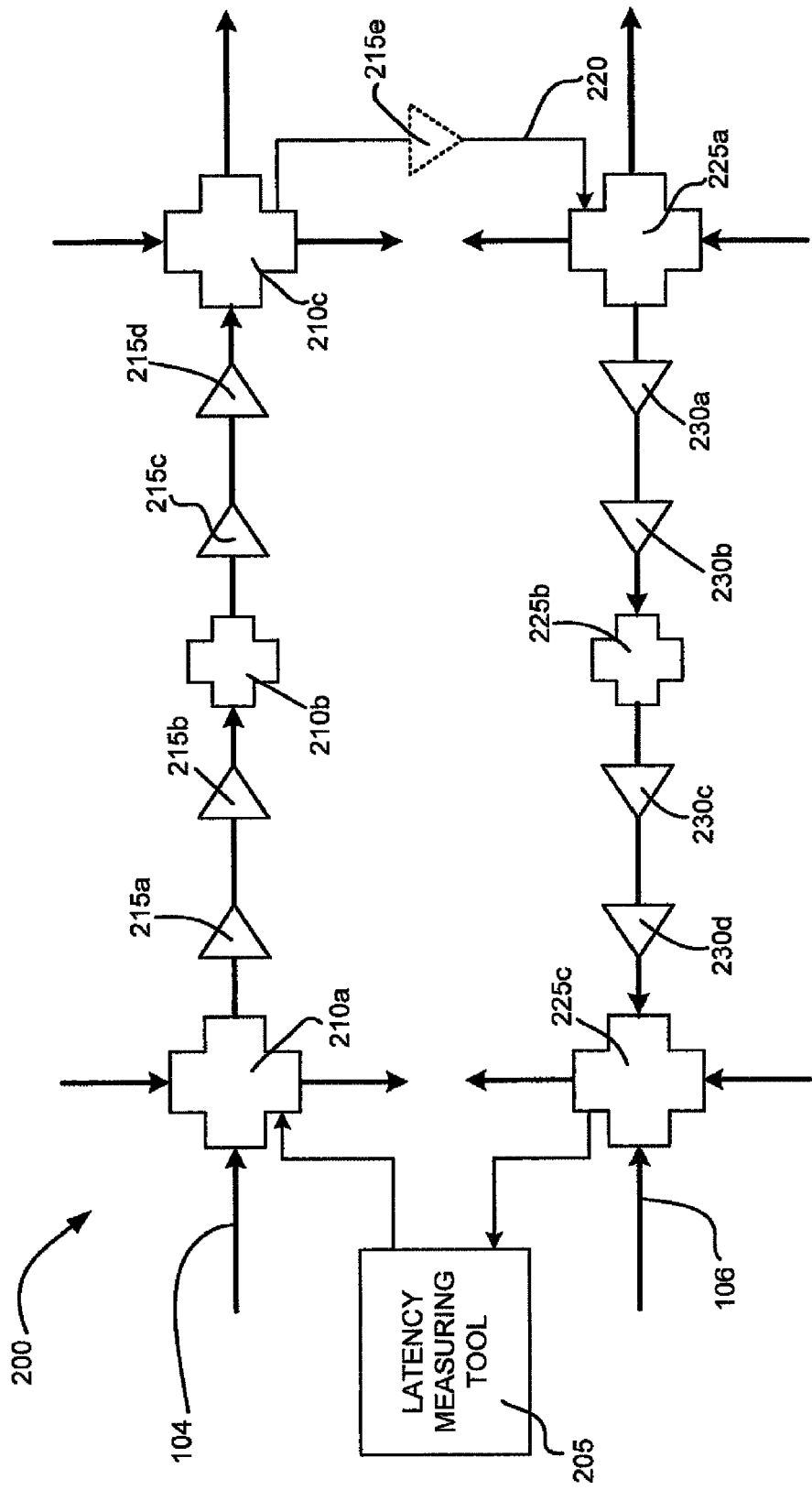
FIG. 2 is a block diagram conceptually illustrating a latency measuring system for use in the system of FIG. 1.

FIG. 2 is a block diagram conceptually illustrating a latency measuring system 200 for use in communications system 100. In the embodiment of FIG. 2, latency measurement system 200 may facilitate measurement of optical latency any number of fiber segments. For example, as shown in FIG. 2, latency measurement system 200 may facilitate latency measurement for a fiber system incorporating a south-east bound fiber 104 and a north-west bound fiber 106 that includes any number of link segments.

As illustrated, latency measurement system 200 may include a latency measurement tool 205, south-east bound fiber 104, south-east reconfigurable optical add/drop multiplexers (ROADMs) 210a, 210b, and 210c (collectively, "south-east ROADMs 210"), south-east optical amplifiers 215a-215d (collectively, "south-east optical amplifiers 215"), a loop back jumper 220, an optional optical amplifier 215e, north-west bound fiber 106, north-west ROADMs 225a, 225b, and 225c (collectively, "north-west ROADMs 225"), and north-west optical amplifiers 230a-230d (collectively, "north-west optical amplifiers 230"). In accordance with embodiments described herein, fiber lengths between ROADMs 210/225 and optical amplifiers 215/230 may be referred to as a "segment." Although only six ROADMs 210/225 and eight optical amplifiers 215/230 are illustrated in FIG. 2, it should be understood that any suitable number of fibers may be switched in accordance with embodiments described herein.

In operation, tunable latency measurement tool 205 may output a tunable optical signal for addition to an open or available channel in south-east bound fiber 104 via ROADM 210a. The received optical signal may pass through various optical elements, such as optical amplifiers 215a-215d and ROADM 210b and may be removed from south-east bound fiber 104 via ROADM 210c. ROADMs 210 may be located at various positions on communications system 100, such as at different sites 102.

As shown, fiber length south-east bound fiber 104 may include several optical amplifiers 215a-215d for facilitating long haul lengths of optical fibers. Prior to the introduction of WDM, optical networks required a separate electrical regenerator every 60 to 100 kilometers. Traffic on each fiber would be converted from the optical domain to the electrical domain and then regenerated for the next span. Optical amplifiers 215a-215d may be used to reamplify the channels on a WDM fiber in the optical domain without the need to de-multiplex, convert to the electrical domain, and individually process the included signals. In one implementation, optical amplifiers 215a-215d may be spaced approximately every 1000 kilometers or so. Although only four optical amplifiers is disclosed for each fiber 104 and 106, any number of optical amplifiers may be supported to facilitate transmission of optical signals between ROADMs 210a and 210c.

The optical signal removed from south-east bound fiber 104 may be fed into an available channel on north-west bound fiber 106 via loop back jumper 220 (and if necessary, optical amplifier 215e) and ROADM 225a. The return optical signal may pass through various optical elements, such as optical amplifiers 230a-230d and ROADM 225b and may be removed from south-east bound fiber 104 via ROADM 225c.

The optical signal may then be fed back into latency measurement tool 205 and compared to the originally generated optical signal. Based on this comparison, an optical latency measurement for the entire optical system through which the signal passed may be calculated.

Figure 3:
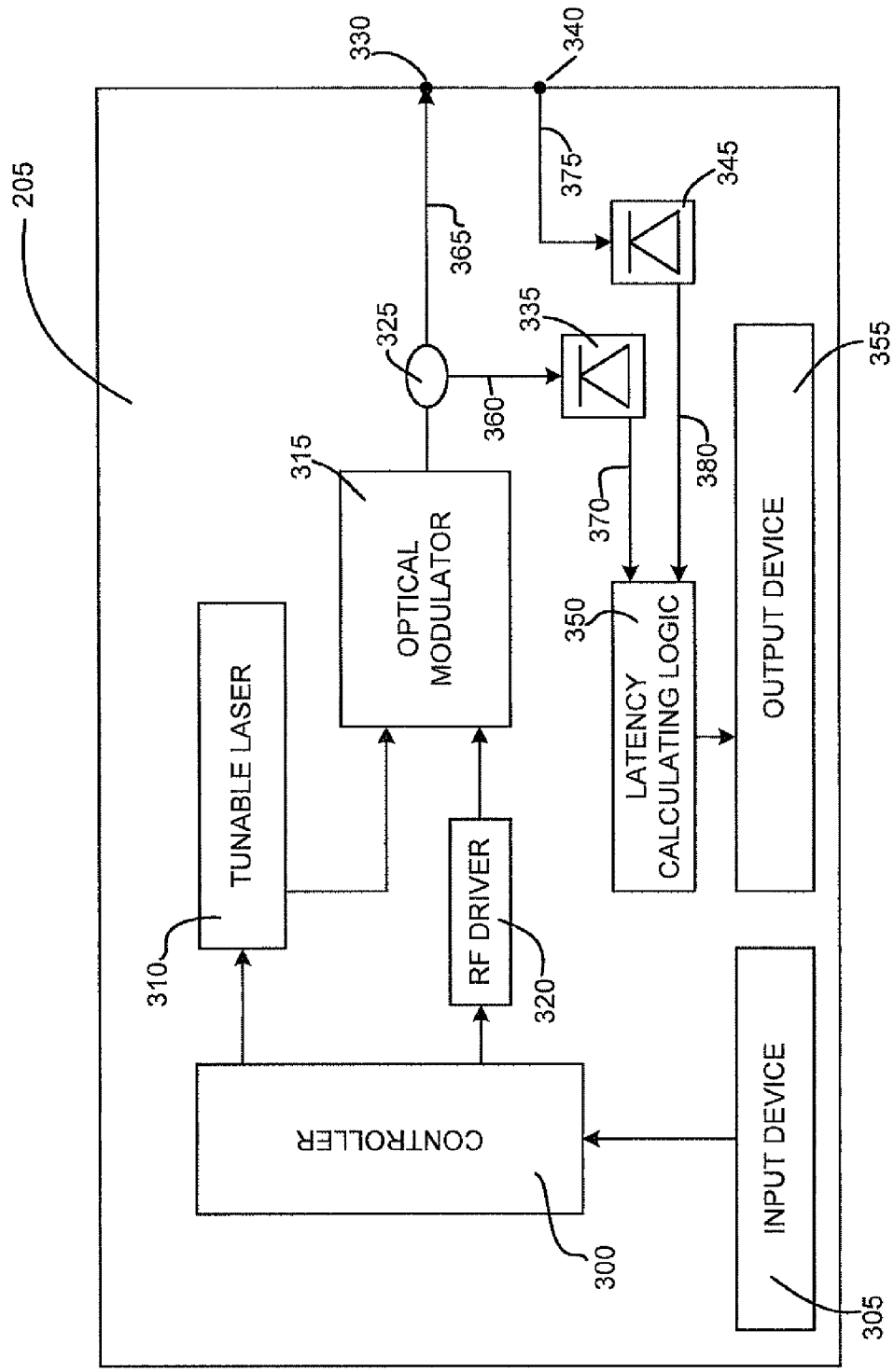
FIG. 3 is a functional block diagram illustrating one exemplary implementation of the latency measuring tool of FIG. 2.

FIG. 3 is a functional block diagram depicting exemplary components of latency measurement tool 205. As illustrated in FIG. 3, latency measurement tool 205 may include an controller 300, an input device 305, a tunable laser 310, a short rise time optical modulator 315, a radio frequency (RF) driver 320, an optical splitter 325, an output port 330, a reference signal photodetector 335, an input port 340, a return signal photodetector 345, latency calculating logic 350, and an output device 355. Although FIG. 3 shows exemplary components of latency measuring tool 205, in other implementations, latency measuring tool 205 may contain fewer, different, or additional components than depicted in FIG. 3.

Controller 300 may include an imbedded microprocessor, computer, workstation, or other type of processor for controlling the operation of latency measurement tool 205. In one implementation, controller 300 may be configured to receive a user selection corresponding to a wavelength to be emitted by tunable laser 310 via input device 305. Input device 305 may include a device or combination of devices that permits a user to input information to latency measuring tool 205, such as a keypad, a dial or dials, a keyboard, a mouse, a pen, a microphone, one or more biometric mechanisms, etc. Input device 305 may be used in combination with output device 355 to facilitate entry of a desired wavelength value. For example, input device 305 may include a knob have a number of predefined wavelength settings. User selection of one of the predetermined settings may include turning the knob to one of the predefined wavelength settings.

Tunable laser 310 may include an electrically tunable optical source configured to output or emit an optical signal having a desired wavelength. For example, tunable laser 310 may include a distributed feedback (DFB) semiconductor laser or a vertical cavity surface emitting laser (VCSEL) that enable wavelength tuning through adjustments to a temperature of the laser device. In response to an instruction from controller 300, tunable laser 310 may output an optical signal at a selected wavelength to optical modulator 315.

Controller 300 may also be configured to receive a user selection corresponding to a pulse period and pulse width to be applied to the output optical signal by RF driver 320. For example, input device 305 may include a suitable interface for receiving a selected pulse period and/or pulse width of the optical signal. In response to these selections, RF driver 320 may generate a RF signal to be applied to the optical signal via optical modulator 315. In one implementation, the RF signal may include a square wave signal or patterned pulse signal having a defined pulse width and/or pulse period.

Figure 4:
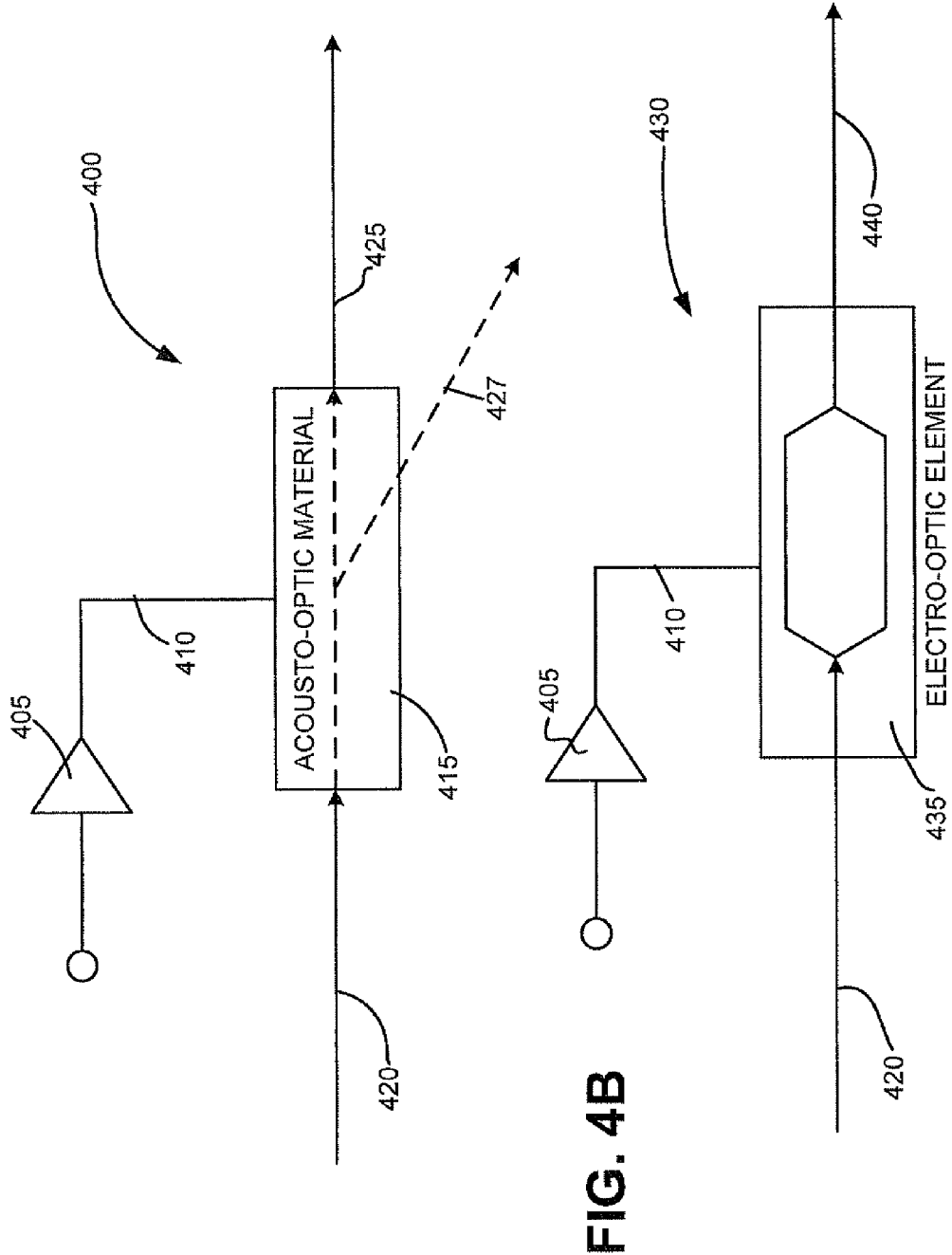
FIGS. 4A and 4B are block diagrams illustrating exemplary implementations of the optical modulator of FIG. 3.

In implementations consistent with embodiments described herein, optical modulator 315 may include a short rise time optical modulator configured to quickly modulate the optical signal received from tunable laser 310 in response to the RF signal received from RF driver 320. In one implementation, as illustrated in FIG. 4A, optical modulator 315 may include an acousto-optic modulator (AOM) 400. As illustrated, AOM 400 may include a RF amplifier 405 for amplifying a RF signal 410 received from RF driver 320 and an acousto-optic material 415 for receiving the amplified RF signal and an optical signal 420 output from tunable laser 310. In one implementation, acousto-optic material 415 may include a transducer mounted thereto (not shown) that operates to convert RF signal 410 into an acoustic wave. The acoustic wave then travels through acousto-optic material 415 and produces periodic variations in its index of refraction in response to RF signal 410. The periodic index variations cause the beam from tunable laser 310 to be diffracted into a fan-like array of beams where angular positions and relative intensities of the diffracted beams depend on frequency and amplitude content, respectively, of the acoustic wave.

By varying the amplitude of the acoustic wave, the intensity of both a zero order output beam 425 and a first order output beam 427 may be intensity modulated. In one implementation, zero order output beam 425 may be forwarded from optical modulator 315 to optical splitter 325, illustrated in FIG. 3. In one implementation, a rise time associated with AOM 400 may be approximately 0.05 µs. That is, output optical signal 425 may be modulated into a square wave or patterned pulse wave based on RF signal 410 with rise times on the order of 0.05 µs.

In a second exemplary implementation, optical modulator 315 may include an electro-optic modulator 430, such as a Mach-Zehnder modulator, as illustrated in FIG. 4B. As shown, electro-optic modulator 430 may also include RF amplifier 405 for amplifying the RF signal 410 received from RF driver 320. Electro-optic modulator 430 may also include an electro-optic element 435 configured to respond to RF signal 410, thereby causing modulation of input beam 420 and resulting in a modulated output beam 440. In one implementation, electro-optic element 435 may include a crystal, such as Lithium niobate, whose refractive index is a function of the strength of an applied electric field. In this embodiment, a phase of output beam 440 may be modulated based on RF signal 410. A Mach-Zehnder modulator may further include a beam splitter (not shown) configured to divide input beam 420 into two paths, one of which may include phase modulator, as described above. The two paths may be recombined. By changing the electric field on the phase modulated path, the amplitude or intensity of output beam 440 may be adjusted based on whether the two beams constructively or destructively interfere.

Returning to FIG. 3, output beam 425/440 may be transmitted from optical modulator 315 to optical splitter 325. At this point, the beam may be split, with a reference beam 360 being transmitted to reference signal photodetector 335 and an output beam 365 being transmitted to output port 330 for delivery to an input port of ROADM 210a, in the manner described above.

Reference signal photodetector 335 may include a device for converting reference optical beam 330 to a reference electrical signal 370. For example, reference signal photodetector 335 may include a photodiode that outputs electric signals in response to a received optical signal. Reference electrical signal 370 may be transmitted to latency calculating logic 350 for use in calculating an optical latency associated with the fiber span being measured.

As described above, output beam 365 may be added to fiber 104 via ROADM 210a, transmitted through various optical segments and returned to input port 340 of latency measuring tool 300 as a return beam 375 from ROADM 225c. Return beam 375 may be transmitted from input port 340 to return signal photodetector 345, where return beam 375 may be converted to from an optical signal to a return electrical signal 380. Return electrical signal 380 may be transmitted to latency calculating logic 350 for use in calculating the optical latency associated with the fiber span being measured.

Based on reference electrical signal 370 and return electrical signal 380, latency calculating logic 350 may calculate an optical latency associated with the optical path being measured. For example, latency calculating logic 350 may identify a time Δt between corresponding rising or falling edges of the square wave or patterned pulse wave of reference electrical signal 370 and return electrical signal 380.

Figure 5:
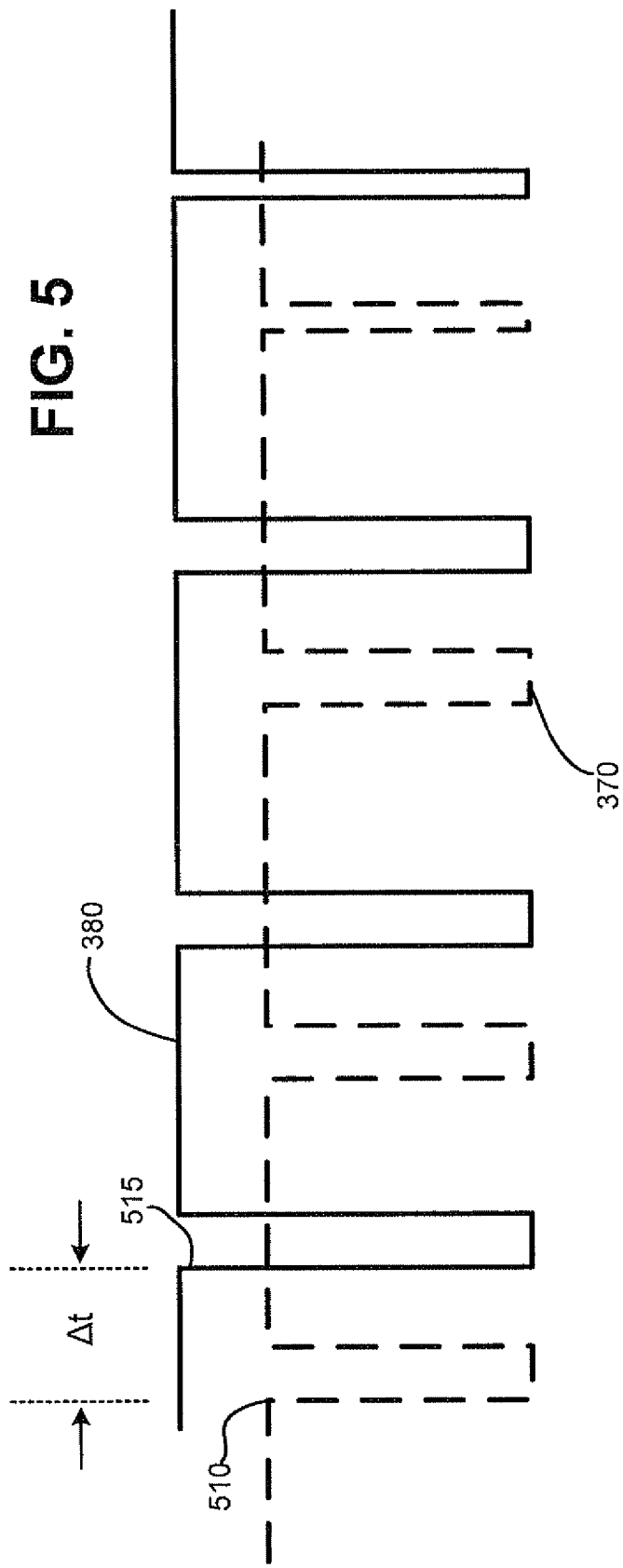
FIGS. 5 and 6 are graphs illustrating latency measurement techniques used by the latency measuring tool of FIG. 3.

For example, in the case of output beam 365 modulated based on a square wave, as shown in FIG. 5, a falling edge 510 of reference electrical signal 370 may be compared to a corresponding falling edge 515 of return electrical signal 380. The resultant Δt derived from this comparison may represent the optical latency in the entire optical path being tested and traversed by output beam 365.

Figure 6:
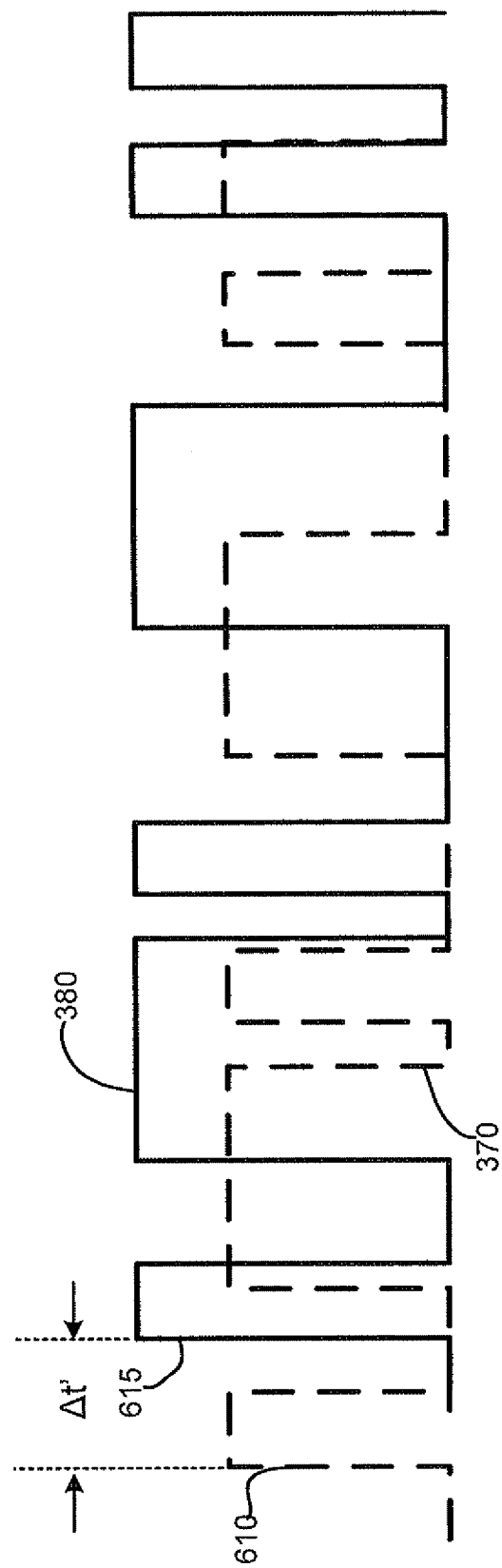

Similarly, in the case of output beam 365 modulated based on a patterned pulse wave, as shown in FIG. 6, a rising edge 610 of reference electrical signal 370 may be compared to a corresponding rising edge 615 of return electrical signal 380. The resultant Δt' derived from this comparison may represent the optical latency in the entire span of fibers 104 and 106 traversed by output beam 365. By providing a patterned pulse wave, a measurable latency period may extend across several pulses. Latency calculating logic 350 may determine latency by identifying a location in the pattern pulse corresponding to the rising edge of the reference electrical signal 370 as well as a location in the pattern pulse corresponding to the rising edge of the return electric signal.

As described above, in some implementations, controller 300 may receive user adjustments to the pulse width (e.g., the time between falling and rising edges of the RF signal) applied via RF driver 320 to match a desired latency measurement range. Similarly, controller 300 may receive user adjustments to the pulse period (e.g., a time between successive falling edges (or successive rising edges) of the RF signal. For example, pulse widths and/or pulse periods may be provided such that a maximum measurable latency is less than the pulse period in the case of the simple square wave of FIG. 5 or less than the pattern period of the patterned pulse wave of FIG. 6. In one example, a maximum latency measurement range of approximately 200 ms may require a square wave pulse frequency of approximately 5 Hz.

Returning to FIG. 3, the calculated latency may be provided to a user of latency measurement tool 205, via output device 355. Output device 355 may include a display (e.g., a LCD (liquid crystal display), a LED (light emitting diode) display, an organic LED (OLED) display), a printer, a network interface for communicating with one or more remote devices, etc.

Figure 7:
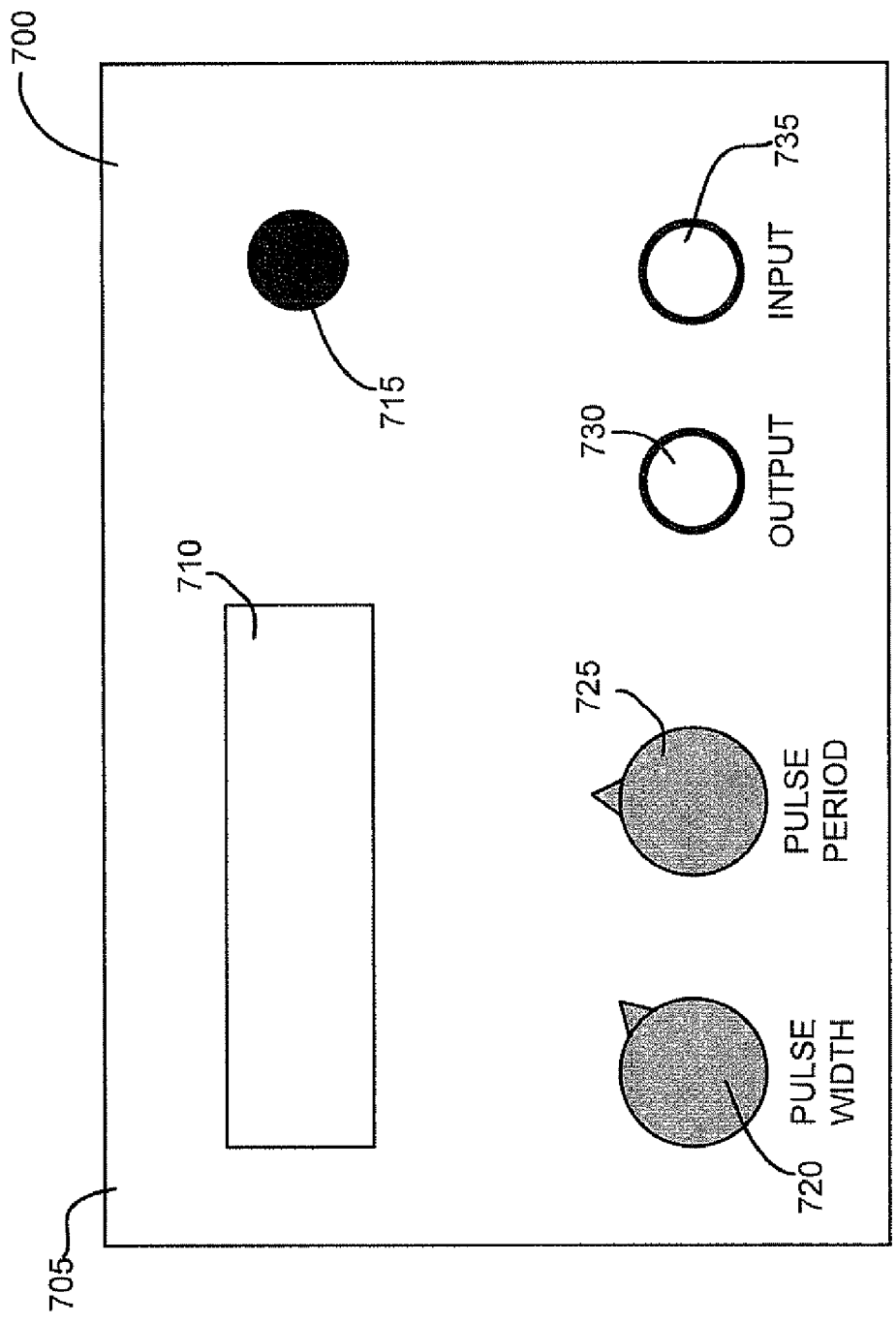
FIG. 7 is a block diagram illustrating an exemplary front panel of the latency measuring tool of FIG. 3.

FIG. 7 is a block diagram illustrating an exemplary front panel 700 of latency measuring tool 205. As illustrated, front panel may include a housing 705, a display 710, a measurement initiation button 715, a pulse width adjustment knob 720, a pulse period adjustment knob 725, an output port 730, and an input port 735. Although FIG. 7 shows exemplary elements of front panel 700, in other implementations, front panel 700 may contain fewer, different, or additional elements than depicted in FIG. 7.

In operation, a user of latency measuring tool 205 may connect an output fiber from output port 730 to an available channel on ROADM 210a and may connect an input fiber from ROADM 225c to input port 735. The user may input a desired pulse width and pulse period for the reference optical signal via knobs 720 and 725. Upon learning that loop back jumper 220 has been appropriately configured at a downstream end of the optical path under testing, the user may then initiate a latency measurement via measurement initiation button 715. In the manner described above, latency measuring tool 205 may calculate the latency of the optical path and may output the resulting latency calculation to the user via display 710.

Figure 8:
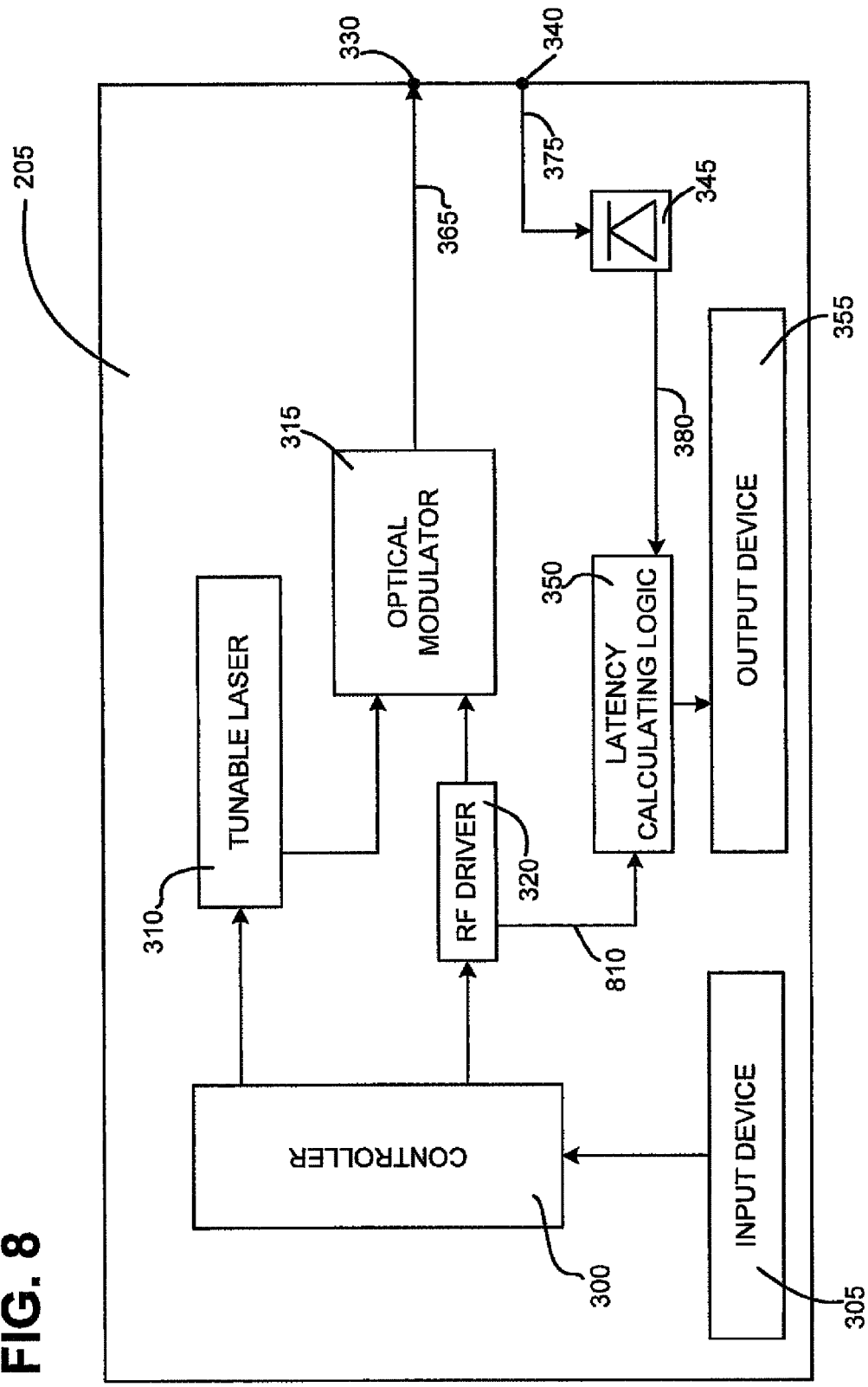
FIG. 8 is another functional block diagram depicting exemplary components of the latency measurement tool of FIG. 3.

FIG. 8 is another functional block diagram depicting exemplary components of latency measurement tool 205. As illustrated in FIG. 8, latency measurement tool 205 may include controller 300, input device 305, tunable laser 310, short rise time optical modulator 315, radio frequency (RF) driver 320, output port 330, input port 340, return signal photodetector 345, latency calculating logic 350, and output device 355. Although FIG. 8 shows exemplary components of latency measuring tool 205, in other implementations, latency measuring tool 205 may contain fewer, different, or additional components than depicted in FIG. 8.

In the embodiment of FIG. 8, controller 300 may be configured to receive a user selection corresponding to a wavelength to be emitted by tunable laser 310 via input device 305. Tunable laser 310 may include an electrically tunable optical source configured to output or emit an optical signal having a desired wavelength. In response to an instruction from controller 300, tunable laser 310 may output an optical signal at a selected wavelength to optical modulator 315.

Controller 300 may also be configured to receive a user selection corresponding to a pulse period and pulse width to be applied to the output optical signal by RF driver 320. For example, input device 305 may include a suitable interface for receiving a selected pulse period and/or pulse width of the optical signal. In response to these selections, RF driver 320 may generate a RF signal to be applied to the optical signal via optical modulator 315. In one implementation, the RF signal may include a square wave signal or patterned pulse signal having a defined pulse width and/or pulse period. In the embodiment of FIG. 8, RF driver 320 may also output a reference RF signal 810 to latency calculating logic 350.

In implementations consistent with embodiments described herein, optical modulator 315 may include a short rise time optical modulator configured to quickly modulate the optical signal received from tunable laser 310 in response to the RF signal received by RF driver 320. An exemplary optical modulator 315 may include acousto-optic modulator 400 of FIG. 4A and electro-optic modulator 430 of FIG. 4B. Output beam 425/440 may be transmitted from optical modulator 315 to output port 330 for delivery to an input port of ROADM 210a in the manner described above with respect to FIG. 2.

As described above, output beam 425/440 may be added to fiber 104 via ROADM 210a, transmitted through various optical segments and returned to input port 340 of latency measuring tool 300 as return beam 375. Return beam 375 may be transmitted from input port 340 to return signal photodetector 345, where return beam 375 may be converted to from an optical signal to return electrical signal 380. Return electrical signal 380 may be transmitted to latency calculating logic 350 for use in calculating the optical latency associated with the optical path being measured.

Based on reference RF signal 810 and return electrical signal 380, latency calculating logic 350 may calculate an optical latency associated with the optical path being measured. For example, latency calculating logic 350 may identify a time Δt between corresponding rising or falling edges of the square wave or patterned pulse wave of both reference RF signal 810 and return electrical signal 380.

Figure 9:
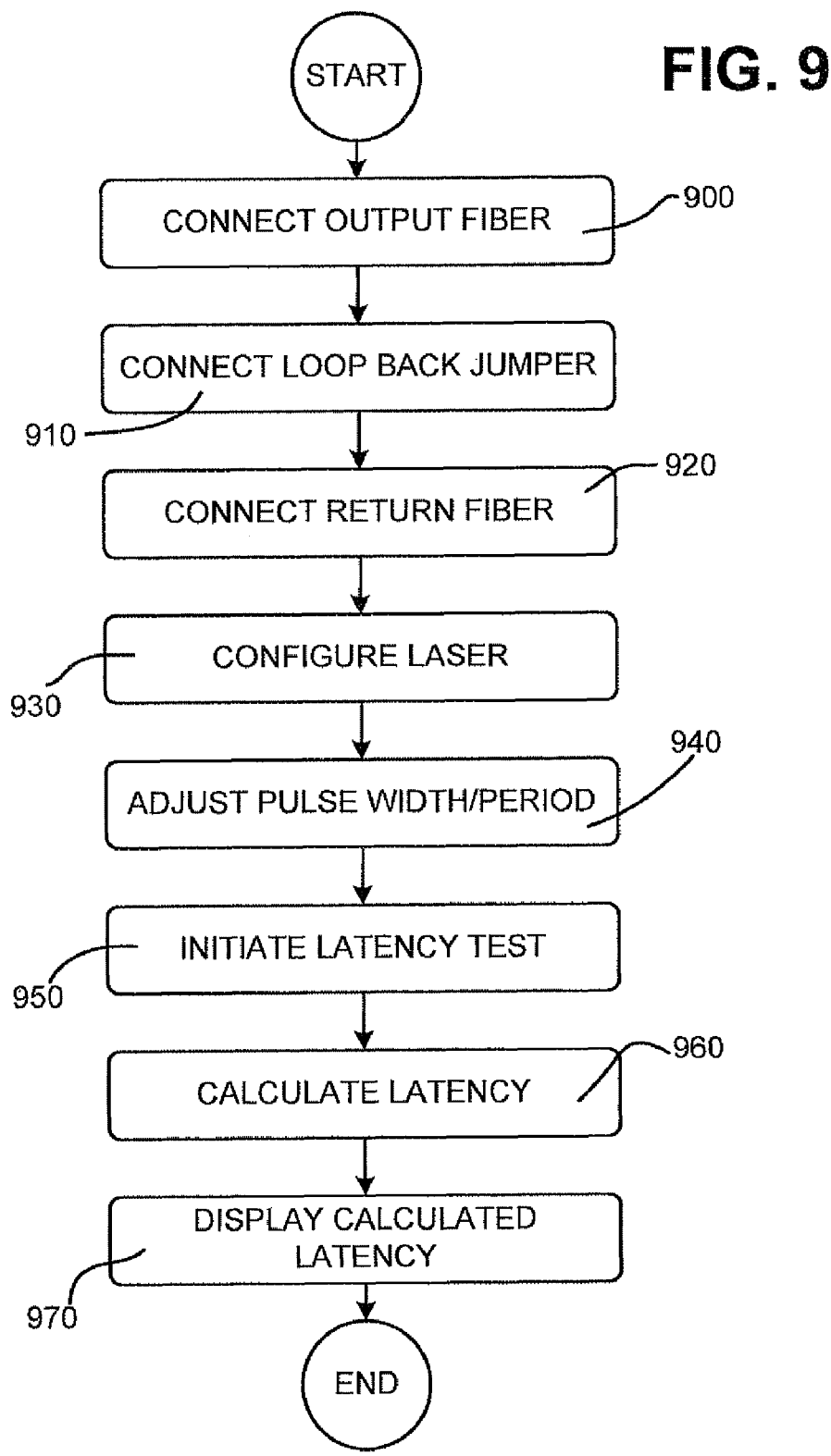
FIG. 9 is a flow diagram illustrating exemplary processing for measuring latency in the system of FIG. 2 using the latency measurement tool of FIG. 3.

FIG. 9 is flow diagram illustrating an exemplary process for measuring optical latency in an optical path. The process may begin upon a user connecting an output optical fiber from output port 330 of latency measuring tool 205 to an input port of ROADM 210a (block 900). Loop back jumper 200 may be connected from an output of ROADM 210c to an input of ROADM 225a (block 910). In some implementations, ROADM 210c/225a may be remote from latency measuring tool 205 and may involve enlisting the involvement an additional individual to configure connection of loop back jumper 220.

A return optical fiber may be connected from an output port of ROADM 225c to input port 340 of latency measuring tool 205 (block 920). Tunable laser 310 may be configured to output an optical signal having a wavelength suitable for an available WDM channel on the optical path (block 930). A pulse width and/or pulse period of the output optical signal may be adjusted via control of RF driver 330 to meet measurement scenarios and channel keep alive power requirements for the WDM system under test (block 940).

A latency test may be initiated based on the adjustments to the wavelength, pulse width, and pulse period of the output optical signal (block 950). Latency calculating logic 350 may calculate the optical latency of the optical path being tested by comparing a reference signal output by latency measuring tool 205 with return beam 375 received at input port 340 (block 960). The calculated latency may be displayed or otherwise output to the user (block 970).

By providing an integrated and easy to use latency measuring system, a field technician or team of technicians may easily and accurately monitor optical latency for any desired optical path, without consideration for a number and type of optical elements or segments included in the path to be tested. Implementations consistent with aspects described herein enable rapid and accurate testing of optical latency for a wide array of path lengths and configurations. More particularly, in one implementation, an adjustable device may output a reference signal into an optical path, receive a return signal following propagation through the path under test, and calculate the latency based on the reference and returned signals.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of blocks have been described with regard to FIG. 9, the order of the blocks may be modified in other implementations. Further, non-dependent blocks may represent blocks that can be performed in parallel. For example, blocks 910-930 may be performed in parallel or in any suitable order. Further, it may be possible to omit blocks within a process, such as blocks 930 and 940, where adjustments to the output signal may not be necessary to test performance.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code-it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device, comprising:
a tunable laser to generate an optical signal at a particular wavelength;
an optical modulator to modulate the optical signal based on a modulation signal;
an output port to output the modulated optical signal to a test optical path;
an input port to receive a return optical signal following propagation through the test optical path;
latency calculating logic to calculate an optical latency for the test optical path based on the modulation signal and the return optical signal; and
a controller to receive user selections for the tunable laser and the modulation signal and configured to initiate calculation of the optical latency by the latency calculating logic, wherein the user selections for the modulation signal further comprise at least one of a pulse width associated with the modulation signal or a pulse period associated with the modulation signal,
wherein the pulse width or the pulse period is selected such that a maximum measurable latency is less than the pulse period.

2. The device of claim 1, where the optical modulator comprises one of an acousto-optic modulator or an electro-optic modulator.

3. The device of claim 2, where the electro-optic modulator comprises a Mach-Zehnder modulator.

4. The device of claim 1 further comprising:
a driver for generating the modulation signal,
where the modulation signal comprises one of a square wave signal, or a pulsed pattern signal.

5. The device of claim 4, where the modulation signal is a radio frequency (RF) signal and where the driver is a RF driver.

6. The device of claim 1, further comprising:
a photodetector for receiving the return optical signal, converting the return optical signal to a return electrical signal, and transmitting the return electric signal to the latency calculating logic.

7. The device of claim 6, further comprising:
a second photodetector for receiving the modulated optical signal prior to output of the modulated optical signal to the test optical path, converting the return optical signal to an output electrical signal, and transmitting the output electrical signal to the latency calculating logic,
where the latency calculating logic calculates the optical latency for the test optical path based on the output electrical signal and the return electrical signal.

8. The device of claim 6,
where the latency calculating logic receives the modulation signal, and
where the latency calculating logic calculates the optical latency for the test optical path based on the modulation signal and the return electrical signal.

9. The device of claim 1,
wherein the optical modulator comprises a short rise time optical modulator.

10. The device of claim 9, wherein a rise time of the optical modulator is approximately 0.5 microseconds.

11. The device of claim 1, further comprising:
an input device for receiving user selections for at least one of the tunable laser or the modulation signal; and
an output device for outputting the calculated optical latency.

12. The device of claim 11, where the output device comprises a display.

13. A system, comprising:
a latency measuring tool;
a optical path to be tested; and
a loop back jumper for connecting an outgoing channel in the optical path to a return channel in the optical path,
wherein the latency measuring tool, further comprises:
a tunable laser to generate an optical beam having a selected wavelength;
an optical modulator to modulate the optical beam based on a modulation signal;
an output port to output the modulated optical beam to the outgoing channel;
a controller to receive user selections for the tunable laser and the modulation signal,
an input port to receive a return optical beam from the return channel; and
latency calculating logic for calculating an optical latency for the optical path based on the modulation signal and the return optical beam,
wherein the controller is configured to initiate calculation of the optical latency by the latency calculating logic, and
wherein the user selections for the modulation signal comprise at least one of a pulse width associated with the modulation signal or a pulse period associated with the modulation signal,
wherein the pulse width or the pulse period is selected such that a maximum measurable latency is less than the pulse period.

14. The system of claim 13,
where the optical path to be tested includes a number of optical segments,
where the optical path includes a first add/drop multiplexer for receiving the modulated optical beam in the outgoing channel from the latency measuring tool, and
where the optical path includes a second add/drop multiplexer for outputting the return optical beam from the return channel to the latency measuring tool.

15. The system of claim 13, where the optical modulator comprises a short rise time optical modulator.

16. The system of claim 15, where the optical modulator comprises one of an acousto-optic modulator or an electro-optic modulator.

17. The system of claim 13, where the optical path includes at least one channel in a wavelength division multiplexing (WDM) fiber optic system.

18. A method, comprising:
generating an optical beam having a selected wavelength;
receiving user selections of a pulse period and a pulse width,
wherein the pulse width or the pulse periods are selected such that a maximum measurable latency is less than the pulse period;
generating a radio frequency (RF) signal based on the received pulse period and pulse width;
modulating the optical beam based on the RF signal, by a short rise time optical modulator, to generate a modulated optical beam;
outputting the modulated optical beam on an optical path;
receiving a return optical beam from the optical path;
calculating an optical latency of the optical path based on a reference RF signal associated with the RF signal and the return optical beam; and
outputting the calculated optical latency.

* * * * *